(12) United States Patent
Schmidberger

(10) Patent No.: US 11,933,811 B2
(45) Date of Patent: Mar. 19, 2024

(54) MEASURING DEVICE FOR MEASURING A PRELOAD OF A FRAMELESS DOOR WINDOWPANE OF A VEHICLE

(71) Applicant: Dr. Ing. h.c. F. Porsche Aktiengesellschaft, Stuttgart (DE)

(72) Inventor: Thomas Schmidberger, Stuttgart (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 58 days.

(21) Appl. No.: 17/674,073

(22) Filed: Feb. 17, 2022

(65) Prior Publication Data
US 2022/0326276 A1 Oct. 13, 2022

(30) Foreign Application Priority Data
Apr. 9, 2021 (DE) .................. 10 2021 108 924.7

(51) Int. Cl.
*G01P 15/14* (2013.01)
*B60J 5/04* (2006.01)

(52) U.S. Cl.
CPC ............ *G01P 15/14* (2013.01); *B60J 5/0411* (2013.01)

(58) Field of Classification Search
CPC ..... B60J 1/00; B60J 5/0411; B60J 1/12; B60J 1/20; B60J 10/50; B60J 10/90; G01L 5/16; G01L 1/04; G01M 17/007; G01M 13/005; B62D 65/06; G01B 3/38; G01B 5/30; G01P 15/14
See application file for complete search history.

(56) References Cited

U.S. PATENT DOCUMENTS

| | | | |
|---|---|---|---|
| 10,214,257 B1* | 2/2019 | Viola | B25B 11/005 |
| 10,538,149 B1* | 1/2020 | DiCarlo | E05F 15/73 |
| 2020/0386640 A1* | 12/2020 | Kreischer | G01L 5/16 |

FOREIGN PATENT DOCUMENTS

DE 102016225511 6/2018

OTHER PUBLICATIONS

Wellner, M. (1991). Force. In: Elements of Physics. Springer, Boston, MA. https://doi.org/10.1007/978-1-4615-3860-8_3 (Year: 1991).*
German Search Report dated Nov. 19, 2021.

* cited by examiner

*Primary Examiner* — Judy Nguyen
*Assistant Examiner* — Martin Walter Braunlich
(74) *Attorney, Agent, or Firm* — Gerald E. Hespos; Michael J. Porco

(57) ABSTRACT

A measuring device (1) for measuring a preload of a frameless door windowpane (2) of a vehicle (3) includes: a holding device (4) for affixing the measuring device (1) to a door windowpane (2) to be checked; an acceleration measuring unit (5) for recording spatial acceleration data (6, 7, 8) about the movement of the measuring device (1); and a communications interface (9) for operating the measuring device (1) and for reading acceleration data (6, 7, 8).

9 Claims, 3 Drawing Sheets

MEASURING DEVICE FOR MEASURING A PRELOAD OF A FRAMELESS DOOR WINDOWPANE OF A VEHICLE

CROSS REFERENCE TO RELATED APPLICATION

This application claims priority under 35 USC 119 to German Patent Appl. No. 10 2021 108 924.7 filed on Apr. 9, 2021, the entire disclosure of which is incorporated herein by reference.

BACKGROUND

Field of the Invention

The invention relates to a measuring device for measuring a preload of a frameless door windowpane of a vehicle, and to a measurement method for measuring a preload of a door windowpane of a vehicle using such a measuring device.

Related Art

Frameless door windowpanes provide a desirable aesthetic appearance. However, a defined preload has to be ensured between the door seal and the door windowpane to minimize the noise of wind when the vehicle is in motion. Thus, the preload needs to be checked during manufacturing and adjusted if necessary. The preload results in a trajectory of the door windowpane when opening and closing the vehicle door, from which it is possible to deduce the preload as a consequence of the installed situation (e.g., the height of the pane in the z-direction) and the rigidity of the pane. To this end, locking the vehicle door in a defined open position and measuring the relative position of the door windowpane in relation to the vehicle door by means of a measuring sensor is known. Within the scope of assembly, it is desirable to have a low susceptibility to errors and to require only the fewest and simplest movements.

Taking this as a starting point, it is an object of the invention to overcome disadvantages known from the prior art. The features of the invention emerge from the claims. The features of the claims may be combined in any technically meaningful manner, with consideration given to the explanations in the following description and features from the figures.

SUMMARY OF THE INVENTION

The invention relates to a measuring device for measuring a preload of a frameless door windowpane of a vehicle. The measuring device of one embodiment comprises: a holding device for affixing the measuring device to a door windowpane that is to be checked; an acceleration measuring unit for recording spatial acceleration data about the movement of the measuring device; and a communications interface for operating the measuring device and for reading the acceleration data.

In the context of this description, the z-direction is aligned upright, for example parallel to the Earth's gravitational field, the y-axis is transverse to the vehicle longitudinal direction (for example parallel to a surface normal of the closed vehicle door), and the x-axis is aligned in the vehicle longitudinal direction (for example in a plane of the closed vehicle door). Ordinal numbers used in this description, where not explicitly indicated to the contrary, serve merely for clear distinction and do not reflect any order or priority of the designated components. An ordinal number greater than one does not require that the presence of a further such component is absolutely necessary.

The measuring device is configured to measure a preload of a frameless door windowpane of a vehicle. The measuring device also can be used for other applications with a lowerable and preloaded door windowpane.

The measuring device described herein enables measurement of the preload of the door windowpane without a tactile measuring sensor. In this case, it is not necessary to lock the vehicle door in a predetermined position during the measurement, nor is it necessary to use further components. It is sufficient to close and reopen the vehicle door with the attached measuring device. To carry out the measurement, the measuring device is affixable to the pane (by means of the holding device) when the vehicle door is open. The measuring device comprises an acceleration measuring unit comprising at least one sensor, for example an acceleration sensor, gyroscope, position sensor and/or further sensors. In an embodiment of the measurement method implemented with this measuring device, the sensor system is zeroed, that is to say a start point is defined, after the vehicle door has been closed. As a result of opening the vehicle door, the seal counter pressure disappears, and the door windowpane tends to its more relaxed or preloaded position. This change in position or trajectory is measured (in the form of acceleration data) by the acceleration measuring unit, optionally evaluated and rendered readable by means of a communications interface. By way of example, the communications interface is a visual display unit, on which the at least one desired value is readable.

The acceleration data are transmitted as raw data or are prepared or interpreted in the measuring device. In one embodiment, the communications interface outputs the preload in readable fashion as an output value. To this end, such a measuring device comprises a computing unit. Alternatively, an external computing unit is configured to prepare the acceleration data and it receives the acceleration data from the communications interface of the measuring device as raw data or in partially processed form, for example as speed values and/or as displacement values. The transmitted data may already have been cleansed of those measurement value components that can be traced back purely to the pivoting of the vehicle door.

In certain embodiments of the measuring device, the holding device that affixes the measuring device to a door windowpane to be checked comprises at least one hook for suspension from the upper window edge of the door windowpane, and/or at least one suction cup for detachable adherence to the window surface of the door windowpane.

In these embodiments, the measuring device is quickly and simply securely affixable to the door windowpane. The holding device may be configured for a measuring device for adjusting the relative position of the door windowpane in relation to the corresponding door seal. Plural hooks may be provided or plural abutment surfaces may be formed by a single hook. These holding devices ensure a uniquely defined relative position of the measuring device in relation to the door windowpane in a simple and reproducible manner.

A holding device that comprises a suction cup, as described herein, holds the measuring device on the door windowpane or its window surface with little, preferably negligible, relative movement between the measuring device and the door windowpane. Alternatively or in addition, the holding device may comprise at least one clamping mechanism (for example a clamping hook).

In some embodiments, the door windowpane may tilt about a tilt axis between the start point and the end point. This tilt arises purely from the preload of the door windowpane to be checked. The acceleration measuring unit may comprise a gyroscope that measures rotational acceleration about an axis of rotation parallel to the tilt axis.

In this embodiment of the measurement method, the tilt movement of the door windowpane is taken into account and only the rotational acceleration geometrically resulting from this tilt movement, or the rotational movement, is taken into account as a displacement that is considered for the preload of the door windowpane to be checked. In an alternative embodiment, only the tilt movement is registered and a translational movement of the door windowpane (for example only in the inward direction in relation to the door, that is to say the y-direction) is taken into account during such a tilt movement.

In a complementary or alternative embodiment, a pivoting movement of the vehicle door, for example about the vertical direction in relation to the vehicle (z-direction), is converted into a displacement of the vehicle door. This movement depends on the geometric relationship that is required for the tilt movement or pivoting movement of the door windowpane for the calculation of the movement of the door windowpane. Specifically, the tilt movement is known from the known geometry of the vehicle door and door windowpane and the measurement at the appropriate measurement location is set reliably by an exact attachment of the measuring device to the door windowpane. This attachment may be obtained by appropriate hooks of the holding device.

The communications interface of the measuring device may comprise at least one of: a visual display unit; an actuator button; and a transmitter for machine-readable transmission of acceleration data.

The change in position or trajectory of the door windowpane is measured (in the form of acceleration data) by the acceleration measuring unit, optionally evaluated and rendered readable by means of a communications interface. The communications interface may comprise a visual display unit, on which at least one desired value is readable. The communications interface also may comprise a transmitter that is configured to communicate (preferably in wireless fashion) with an external system, for example by means of a standardized transfer protocol and/or transfer frequency (e.g., WLAN or PAN). Alternatively or in addition, the communications interface may be a printer unit and the at least one desired value is readable on a printout.

An actuator button, such as a start button and a stop button may be provided so that a measurement can be started and terminated manually. The actuator button may comprises a touch-sensitive defined area, for example a so-called touchscreen, and this activation button may form at least part of the surface of a visual display unit.

The holding device and the acceleration measuring unit may be formed separately from one another, and the acceleration measuring unit may be detachably affixable in the holding device. The acceleration measuring unit may comprise a mobile terminal such as a smartphone.

In this embodiment, the holding device is formed separately from the acceleration measuring unit, and preferably from the communications interface. The communication interface may be connected or connectable communicatively to the acceleration measuring unit. Consequently, the holding device may be connectable in another step to the door windowpane, and the holding device may be usable for another measuring device. Alternatively or in addition, the acceleration measuring unit can be used for other measurements, for which a different holding device is optionally used. The acceleration measuring unit may be a mobile terminal that is utilizable at different locations and that is configured for mobile use. In some embodiments, the mobile terminal is configured for wireless communication, and the mobile terminal may be a smartphone. The measuring method may be carried out by an application (referred to as an app for short) using only the sensor system comprised by the smartphone. This sensor system (for example comprised as standard) then forms an acceleration measuring unit, at least in software. Together with the holding device, the mobile terminal is usable as the measuring device specified here.

The measuring device may comprise a computing unit by means of which the recorded acceleration data are convertible into a displacement along a trajectory of the door windowpane that corresponds to the preload of the door windowpane to be checked.

A computing unit or a computer-assisted device comprises one or more processors, for example an all-purpose processor (CPU) or a microprocessor, RISC processor, GPU and/or DSP. By way of example, the computer-assisted device comprises additional elements such as storage device interfaces. Optionally or in addition, the terms denote a device that is able to execute a provided or incorporated program, preferably using a standardized programming language such as C++, JavaScript or Python, for example, and/or to control and/or access data storage apparatuses and/or other apparatuses such as input interfaces and output interfaces. The term computer-assisted device also refers to a multiplicity of processors or a multiplicity of (sub-) computers, which are interconnected and/or otherwise communicatively connected and which possibly use one or more other resources, for example a storage device, together.

A (data) storage device is for example a hard disk drive (HDD, SSD, HHD) or a (non-volatile) solid-state storage device, for example a ROM storage device or a flash storage device (flash EEPROM) The storage device often comprises a plurality of individual physical units or is distributed over a multiplicity of separate apparatuses such that access to said device is implemented by way of data communication, for example a package data service. The latter is a decentralized solution where storage devices and processors of a multiplicity of separate computing units are used instead of a (single unit) central on-board computer or in addition to a central on-board computer.

A measurement method for measuring a preload of a door windowpane of a vehicle also is provided and includes: affixing a measuring device as described herein to a door windowpane to be tested of a pivotable vehicle door; starting the recording of spatial acceleration data by means of the measuring device; moving the pivotable vehicle door to which the door windowpane to be checked belongs along its trajectory between a closed state and an open state; terminating the recording of spatial acceleration data by means of the measuring device; and using the communications interface to output the recorded acceleration data for a readout.

The steps of the method may be carried out by hand. However, the steps of the method also may be carried out by a robotics system or in any other automated way. Acceleration data are measured and recorded by the measuring device, or with the aid of the acceleration measuring unit thereof. A displacement of the door windowpane is calculated by twice integrating the acceleration data from the purely translational acceleration data, optionally with a preceding or subsequent axis correction. In this way, a preload is calculated and subsequently rendered readable by way of the communications interface. Alternatively, raw data, namely the recorded acceleration data or processed acceleration data, for example velocity data or displacement data, are rendered readable via the communications interface by an internal computing unit.

The method also may include using the measuring device to calculate a preload of the door windowpane to be checked, on the basis of the measured acceleration data along a trajectory of the associated vehicle door; and using the communications interface to output the calculated preload for a readout.

The invention also comprises a computer program comprising computer program code. The computer program code is executable on at least one computer in such a way that the at least one computer is prompted to carry out the measurement method described herein. At least one of the computers: is contained in the measuring device or the computing unit thereof; is contained in an external measuring unit which is communicatively connected to the measuring device; is integrated in an on-board computer of a motor vehicle; and/or is configured to communicate with an on-board computer of a motor vehicle.

The invention further comprises a computer program product on which the computer program code is stored. The computer program code is executable on at least one computer in such a way that the at least one computer is prompted to carry out the measurement method according to an embodiment as described herein. At least one of the computers: is contained in the measuring device or the computing unit thereof; is contained in an external measuring that which is connected communicatively to the measuring device; is integrated in an on-board computer of a motor vehicle; and/or is configured to communicate with an on-board computer of a motor vehicle.

A computer program product comprising computer program code is, for example, a medium such as: a RAM, a ROM, an SD card, a memory card, a flash memory card or a disc. Alternatively, a computer program product may be stored on a server and downloadable. As soon as the computer program has been rendered readable by way of a readout unit, for example a disk drive and/or an installation, the computer program code contained therein and the method contained therein are executable by a computer or in communication with a plurality of computer-assisted devices, for example as per the description above.

The measurement method may include measuring in advance a pure pivoting movement of the vehicle door with the door windowpane to be tested, and then calculating the preload. The pure pivoting movement of the vehicle door then is subtracted from the measured movement of the door windowpane.

The method also may include fastening a further measuring device to the vehicle door outside of the door windowpane, and subtracting the measurement values of this second measuring device from the measurement values of the above-described measuring device on the door windowpane, or the data are superposed. The difference of these measurement values corresponds to the movement of the (first) measuring device at the door windowpane and is output as result.

The movement or the acceleration data of the vehicle door when opening or closing the vehicle door can be measured or collected in advance. The door windowpane then is not transferred into the completely closed position and hence no movement of the door windowpane caused by the preload is superimposed. In this context, in advance means that a pivoting movement of such a vehicle door was measured, generally in empirical fashion, and stored in a computing unit, for example within the measuring device. In an alternative embodiment, this step is carried out in advance every time, with this step not requiring much time, for example by virtue of moving the door windowpane down slightly (for example by the distance of the short stroke) out of the (upper) pane seal and then pivoting the vehicle door. In an embodiment, a predetermined pivoting displacement is required, which is for example rendered necessary by a stop or by complete opening of the vehicle door (up to its own hinge stop). As an alternative, an acceleration value merely is recorded in averaged fashion, and the averaged acceleration value is subtracted. Moreover, the door windowpane also experiences a certain counter pressure by way of the lateral door seals. This counter pressure influences the position of the slightly opened pane. For this situation, a separate measurement of the movement data of the door or the measurement of the door movement data is advantageous.

The measurement method also may include checking the start point and the end point of the displacement resulting purely from the preload of the door windowpane and are assumed to be where the door windowpane experiences a specific jerk. The specific first jerk may define the start point of the displacement and may be caused by: the start or end of a short stroke of the door windowpane to be tested, an abutment of the door windowpane to be tested against its associated window seal, and/or an abutment of the associated vehicle door against its associated door seal, and/or a specific second jerk preferably defining the end point of the displacement, the second jerk being caused being triggered by the start or end of a short stroke of the door windowpane to be tested. The word jerk denotes a derivative (differentiation) of the acceleration with respect to time. This embodiment of the measurement method is such that a specific jerk occurs during the movement of the vehicle door or the (automated) movement of the door windowpane when moving the vehicle door. The jerk is recognizable by the acceleration measuring unit or a computing unit that may be within the measuring device. By way of example, the jerk is the start or end of the short stroke, and the door windowpane tilts from its completely closed position (as a rule, in a position loaded in the outward direction in relation to the door) into the more relaxed (preloaded) position (as a rule, in the inward direction in relation to the door). By way of example, the end of this tilt movement is linked to a second specific jerk because the door windowpane is then held by a further element, for example the door-side window seal, transverse to the tilt movement of the door windowpane or an outer counter bearing relative to the door windowpane within the vehicle door (in conjunction with the internal load of the door windowpane).

Alternatively, in a measurement method carried out when the door is closed rather than opened, the abutment of the door windowpane and/or of the vehicle door is a specific first jerk for the start point of the displacement of the door windowpane that is characteristic for the preload of the door windowpane. When the door windowpane abuts, the latter is in contact with a window seal that is aligned approximately vertically in relation to the vehicle. The second jerk may define the end point of the displacement and may be characteristic for the preload of the windowpane. The second jerk is triggered before the start or end of the short stroke. By way of example, the vehicle door or the door windowpane abuts when the vehicle door is closed and the short stroke subsequently is carried out. During the short stroke, the door windowpane carries out the displacement that corresponds to the preload of the door windowpane.

A further specific jerk is, for example, a rotational movement about the pivot axis of the vehicle door. The pivot axis of the door is vertical in relation to the vehicle or parallel to the Earth's gravitational field. By way of example, this start of the pivoting movement accompanies the relatively sudden unlocking of the lock of the vehicle door.

Whether a specific jerk is defined at the start or end of the short stroke depends, for example, on the inertia and/or on the embodiment of the corresponding pane seal.

In one embodiment of the measurement method, the door windowpane tilts about a defined tilt axis between the start point and the end point due purely from the preload of the door windowpane to be checked. All of the acceleration data measured during a tilt movement about the tilt axis of the door windowpane is considered for the calculation of the preload. The acceleration measuring unit may comprise a gyroscope, by means of which a rotational acceleration about an axis of rotation parallel to the tilt axis is measurable.

In this embodiment of the measurement method, the tilt movement of the door windowpane is taken into account and only the rotational acceleration geometrically resulting from this tilt movement or the rotational movement is taken into account as a displacement, which is considered for the preload of the door windowpane to be checked. In an alternative embodiment, only the tilt movement is registered and a translational movement of the door windowpane (for example only in the inward direction in relation to the door, that is to say the y-direction) is taken into account during such a tilt movement.

In a complementary or alternative embodiment, a pivoting movement of the vehicle door, for example about the vertical direction in relation to the vehicle (z-direction), is converted into a displacement of the vehicle door. This movement depends on the geometric relationship that is required for the tilt movement or the pivoting movement of the door windowpane for the calculation of the movement of the door windowpane. Specifically, the tilt movement is known initially from the known geometry of the vehicle door and door windowpane and second the measurement at the appropriate measurement location is set reliably by an exact attachment of the measuring device to the door windowpane, for example by appropriate hooks of the holding device.

The above-described invention will be discussed in detail below against the relevant technical background with reference to the associated drawings. The invention is not in any way restricted by the purely schematic drawings, and it should be noted that the drawings are not to scale and are not suitable for defining size ratios.

DETAILED DESCRIPTION

Figure 1:
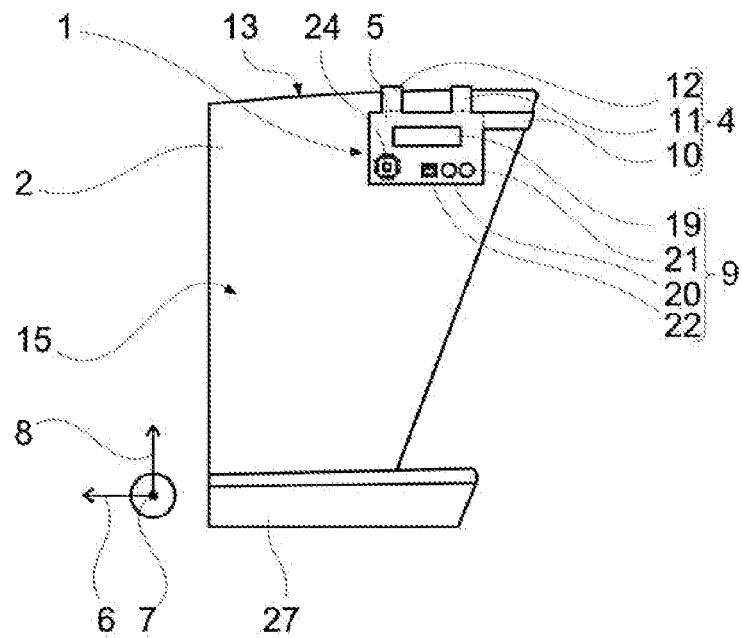
FIG. 1 shows a vehicle side view of a measuring device fastened to a door windowpane.

In FIG. 1, a measuring device 1 fastened to a door windowpane 2 is shown in a vehicle side view in such a way that the view is directed at the pane surface 15. In accordance with the illustration, the bottom of the door windowpane 2 is held (in the z-direction) in a vehicle door 27. In this embodiment, the measuring device 1 is positioned at the top right end of the door windowpane 2 by means of a holding device 4. The holding device 4 comprises three hooks 10, 11, 12 that are hooked on the window edge 13 and ensure a fixed position on the door windowpane 2 in the x-direction, y-direction and z-direction. Optionally, provision is made of a suction cup 14 (cf. FIG. 2).

In this embodiment, the measuring device 1 comprises an acceleration measuring unit 5, a computing unit 24, a communications interface 9, a visual display unit 19, a first actuator button 20, a second actuator button 21 and a transmitter 22. The acceleration measuring unit 5 is configured to measure acceleration data 6, 7, 8 in all three spatial directions and/or about two or three axes of rotation. The measurement of acceleration data 6, 7, 8 may be started by the first actuator button 20 and terminated by the second actuator button 21, or vice versa.

Figure 2:
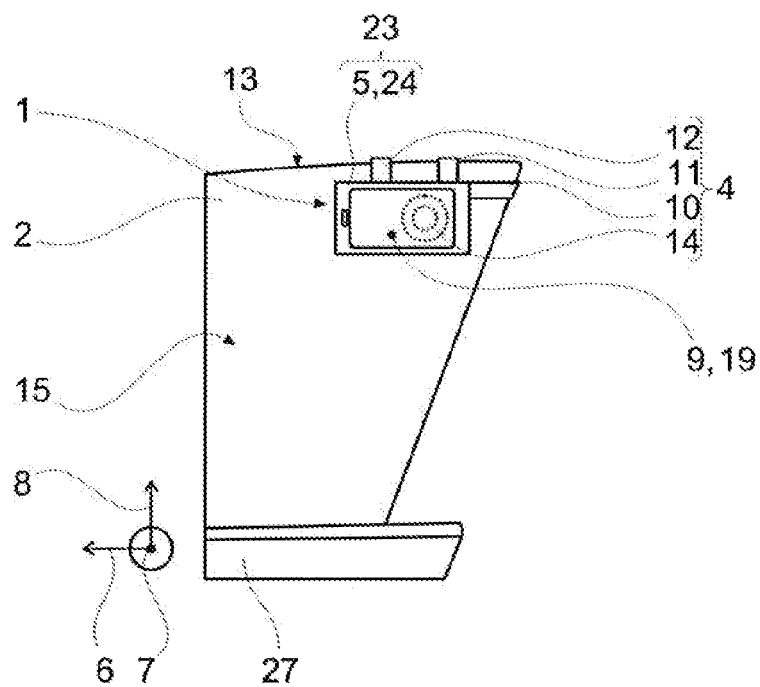
FIG. 2 shows a vehicle side view of an alternative embodiment of a measuring device fastened to a door windowpane.

FIG. 2 illustrates an alternate embodiment of a measuring device 1 that is fastened to a door windowpane 2 and is a vehicle side view looking at the pane surface 15, as in FIG. 1. In this embodiment, an acceleration measuring unit 5 is comprised by a mobile terminal 23 that is embodied separately from the holding device 4. In addition to three hooks 10, 11, 12, the holding device 4 in this embodiment additionally comprises a suction cup 14 to ensure fixation of the mobile terminal 23 in the x-direction and y-direction on the pane surface 15. By way of example, the mobile terminal 23 is a smartphone and comprises a touchscreen as communications interface 9. The gyroscope and acceleration sensors form the acceleration measuring unit 5, for example by means of an app (computer program) installed on the mobile terminal 23.

Figure 3:
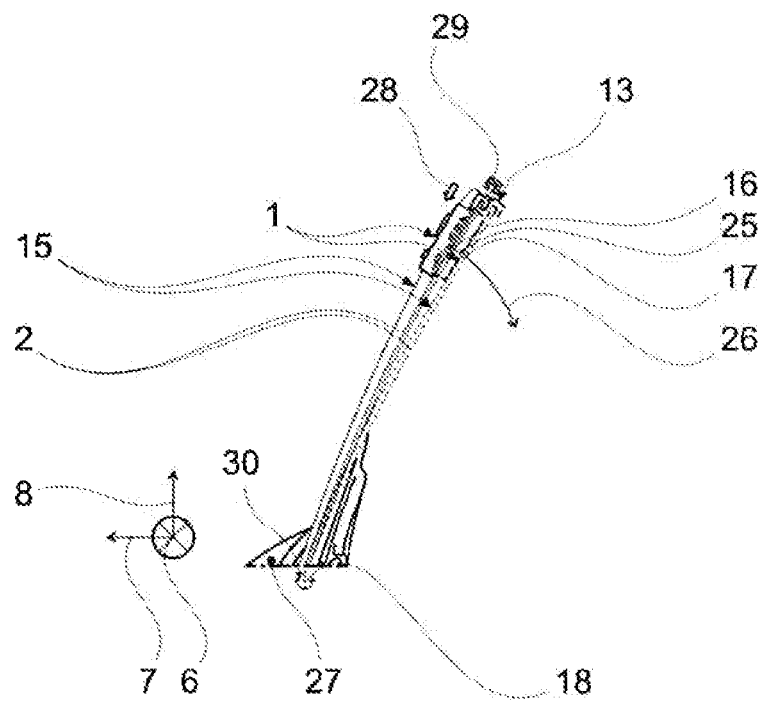
FIG. 3 shows a door rear view of the measuring device of FIG. 1 fastened to a door windowpane.

FIG. 3 is a rear view of a measuring device 1 fastened to a door windowpane 2. The main component of the door windowpane 2 extends in the z-direction and x-direction, and is inclined and curved slightly inwardly in the y-direction. The door windowpane 2 has an external pane surface 15 delimited to the top by a window edge 13. At the lower end of the door windowpane 2 in the z-direction, the door windowpane 2 is held in a vehicle door 27 and is able to be raised and lowered. A tilt axis 18 is formed together with the vehicle door 27 (in this case on the door-side seal in exemplary fashion), the door windowpane 2 carrying out a tilt movement 30 about the tilt axis while the vehicle door 27 is transferred from the loaded position into the preloaded position, or vice versa. A movement of the measuring device 1 in the y-direction arises therefrom.

The measuring device 1 affixed to the door windowpane 2 records the trajectory 26 of the windowpane 2 between a start point 16 and an end point 17. Together with the measuring device 1, the door windowpane 2 is illustrated using a solid line at the start point 16 and using a dashed line at the end point 17. A short stroke 28 is carried out when the vehicle door 27 is opened and causes the door windowpane 2 to be pulled out of its pane seal 29. What is shown here, in simplified fashion or with the assumption of great inertia, is that the door windowpane 2 follows the direction of the short stroke 28 and does not yet adopt the position illustrated using the dashed line from its loaded position. In an embodiment, the short stroke 28 can be interpreted as start point 16 or end point 17 of the trajectory 26 and is measured by an acceleration measuring unit 5 of the measuring device 1 (in the form of, for example, virtually purely translational acceleration data 8, predominantly in the z-direction), optionally evaluated and rendered readable at the measuring device (1) by means of the communications interface (9). Alternatively or in addition, the acceleration measuring unit (5) is able to measure a tilt of the door windowpane (2) and in an embodiment of the measurement method, the translational displacement (25) in the y-direction (and optionally in the z-direction as well) is recorded only during the tilt movement and/or the measured tilt is converted into the displacement (25) of the preload by means of the geometrical relationship.

Figure 4:
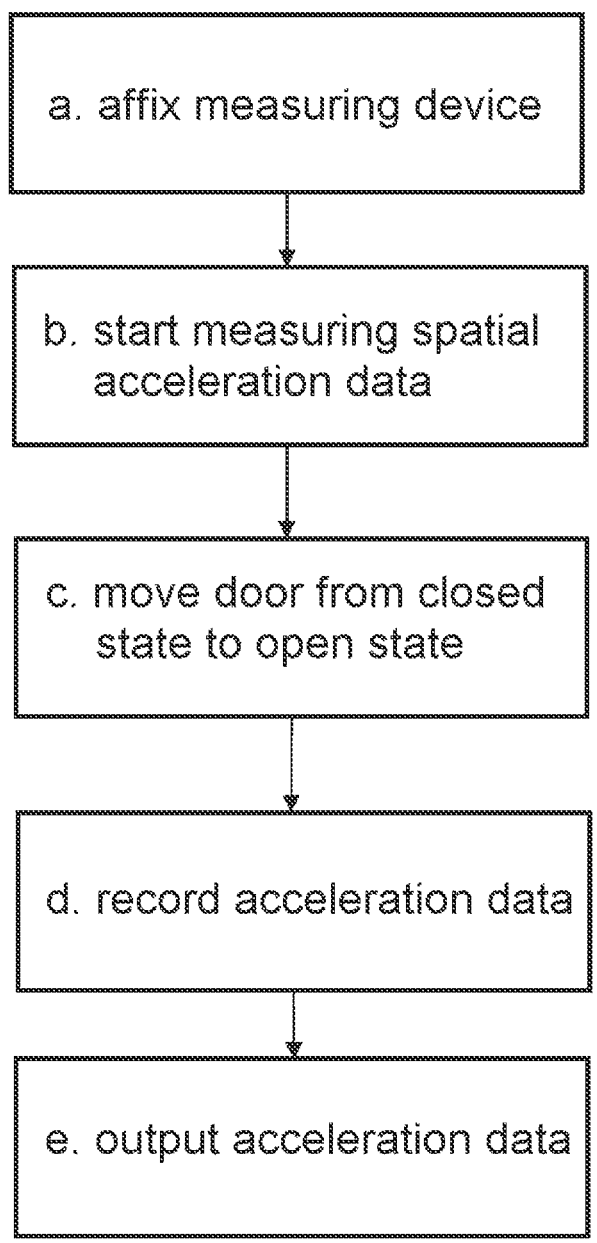
FIG. 4 illustrates an embodiment of a measurement method.

FIG. 4 illustrates a measuring method. Step a includes affixing a measuring device (1) on a windowpane (2) of a pivotable vehicle door (27) that is to be checked. Step b includes starting recording spatial acceleration data (6, 7, 8). Step c includes moving the vehicle door (27) with its associated door windowpane (2) on a trajectory (26) between its closed and open states. Step d includes terminating use of the measuring device (1) for recording acceleration data (6, 7, 8). Step e includes using the communications interface (9) for outputting the acceleration data (6, 7, 8).

Figure 5:
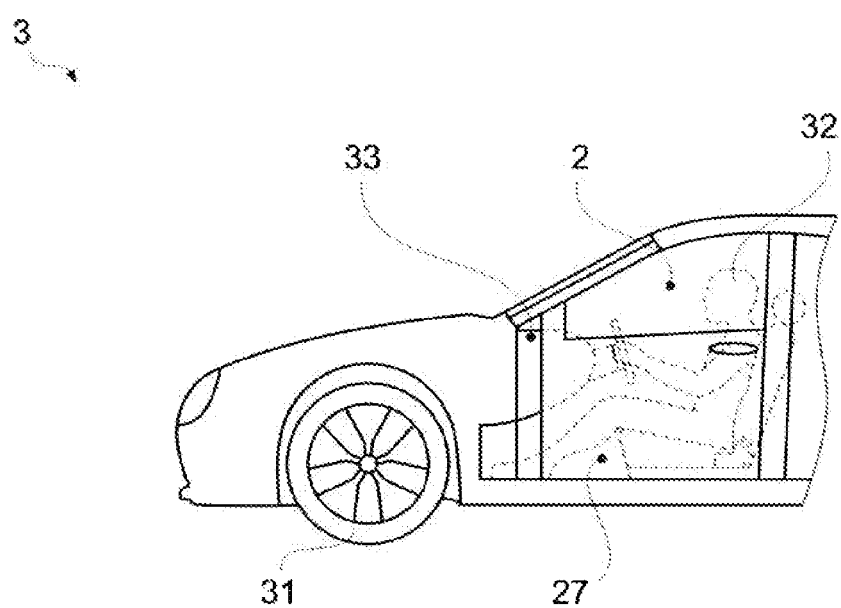
FIG. 5 is a cross-section of a vehicle with a frameless door windowpane.

FIG. 5 is a sectional side view of a vehicle (3) with a frameless door windowpane (2). The vehicle (3) has wheels (31), at least one of which is designed for propulsion. A vehicle door (27) is pivotable (approximately) about the A pillar (33) so that a vehicle occupant (32) can enter. The frameless door windowpane (2) is held in the vehicle door (27).

The measuring device (1) enables a simple measurement for checking and/or adjusting the preload of a frameless door windowpane of a vehicle door.

What is claimed is:

1. A measuring device (1) for measuring a preload of a frameless door windowpane (2) of a door (27) of a vehicle (3), the frameless door windowpane (2) being tiltable about a defined tilt axis (18) between a start point (16) and an end point (17) due to a preload of the frameless door windowpane (2) comprising:
    a holding device (4) for affixation to the frameless door windowpane (2);
    an acceleration measuring unit (5) for recording spatial acceleration data (6, 7, 8) of the measuring device (1) affixed to the frameless door windowpane (2), the acceleration measuring unit (5) comprising a gyroscope that measures a rotational acceleration of the frameless door windowpane (2) about an axis of rotation parallel to the tilt axis (18); and
    a communications interface (9) for operating the measuring device (1) and for reading the acceleration data (6, 7, 8).

2. The measuring device (1) of claim 1, wherein the holding device (4) comprises
    at least one hook (10, 11, 12) embodied separately from the acceleration measuring unit (4) and configured for suspension from an upper window edge (13) of the frameless door windowpane, and
    at least one suction cup (14) spaced from the at least one hook (10, 11, 12) and disposed between the acceleration measuring unit (5) and the frameless door windowpane (2), the at least one suction cup (14) being detachably securable to a window surface (15) of the frameless door windowpane.

3. The measuring device (1) of claim 1, wherein the door windowpane (2) is tiltable about a defined tilt axis (18) that is in a vehicle door (27) of the vehicle (3) and extends parallel to an x-axis (6) longitudinal direction of the vehicle (3), tilting of the frameless door windowpane (2) about a defined tilt axis (18) being between a start point (16) and an end point (17) due to a preload of the frameless door windowpane (2) to be checked, and
    the acceleration measuring unit (5) comprises a gyroscope that measures a rotational acceleration about an axis of rotation parallel to the tilt axis (18).

4. The measuring device (1) of claim 1, wherein the communications interface (9) comprises at least one of:
    a visual display unit (19);
    an actuator button (20, 21); and
    a transmitter (22) for machine-readable transmission of acceleration data.

5. The measuring device (1) of claim 1, wherein the holding device (4) and the acceleration measuring unit (5) are formed separately from one another, with the acceleration measuring unit (5) being detachably affixable in the holding device (4), and the acceleration measuring unit (5) comprising a mobile terminal (23).

6. The measuring device (1) of claim 1, further comprising a computing unit (24) by means of which recorded acceleration data (6, 7, 8) are convertible into a displacement (25) along a trajectory (26) of the frameless door windowpane (2), the displacement (25) corresponding to the preload of the frameless door windowpane (2) to be checked.

7. A measurement method (1) for measuring a preload of a frameless door windowpane (2) of a vehicle (3), comprising the following steps:
    affixing the measuring device (1) to a frameless door windowpane (2) of a pivotable vehicle door (27) to be tested;
    using the measuring device (1) to start recording spatial acceleration data;
    opening the pivotable vehicle door (27) to which the door windowpane (2) to be checked belongs along a trajectory (26) from a closed state to an open state;
    terminating the recording of spatial acceleration data by the measuring device (1);
    using the communications interface (9) to output the recorded acceleration data (6, 7, 8) for a readout;
    measuring a pure pivoting movement of the vehicle door (27) that has the frameless door windowpane (2) to be tested; and
    subtracting the pure pivoting movement of the vehicle door (27) from the measured movement of the frameless door windowpane (2) to calculate the preload.

8. The measurement method of claim 7, wherein
    a start point (16) and an end point (17) of the displacement (25) emerging purely from the preload of the door windowpane (2) to be tested is assumed to be where the frameless door windowpane (2) experiences a specific jerk,
    a specific first jerk defining the start point (16) of the displacement (25), the first jerk being caused by:
    a start or end of a short stroke (28) of the frameless door windowpane (2) to be tested,
    abutment of the frameless door windowpane (2) to be tested against its associated window seal (29),
    abutment of the vehicle door (27) against its associated door seal, and/or
    a specific second jerk defining the end point (17) of the displacement (25) and caused by a start or end of a short stroke (28) of the frameless door windowpane (2) to be tested.

9. The measurement method of claim 7, wherein
    the frameless door windowpane (2) tilts about a defined tilt axis (18) between the start point (16) and the end point (17) due purely from the preload of the frameless door windowpane (2), all of the acceleration data (7, 8) measured during a tilt movement (30) about the tilt axis (18) of the door windowpane (2) being considered for the calculation of the preload, and the acceleration measuring unit (5) comprises a gyroscope that measures a rotational acceleration about an axis of rotation parallel to the tilt axis (18) is measurable.

* * * * *